June 4, 1957     J. C. PLASTARAS ET AL     2,794,486
METHOD OF AND MEANS FOR CORRECTING A PHOTOTYPOGRAPHICAL FILM
Filed April 13, 1954     6 Sheets-Sheet 1

Fig. 1

INVENTORS
JAMES C. PLASTARAS
EUGENE F. COLEMAN

BY
ATTORNEYS

June 4, 1957     J. C. PLASTARAS ET AL     2,794,486
METHOD OF AND MEANS FOR CORRECTING A PHOTOTYPOGRAPHICAL FILM
Filed April 13, 1954     6 Sheets-Sheet 4

INVENTORS
JAMES C. PLASTARAS
EUGENE F. COLEMAN
ATTORNEYS

June 4, 1957   J. C. PLASTARAS ET AL   2,794,486
METHOD OF AND MEANS FOR CORRECTING A PHOTOTYPOGRAPHICAL FILM
Filed April 13, 1954   6 Sheets-Sheet 5

INVENTORS
JAMES C. PLASTARAS
EUGENE F. COLEMAN

BY *Morrison Kennedy*
*Hampsted* ATTORNEYS

United States Patent Office 2,794,486
Patented June 4, 1957

2,794,486

METHOD OF AND MEANS FOR CORRECTING A PHOTOTYPOGRAPHICAL FILM

James C. Plastaras, Lynbrook, and Eugene F. Coleman, Brooklyn, N. Y., assignors to Mergenthaler Linotype Company, a corporation of New York Application April 13, 1954, Serial No. 422,862

20 Claims. (Cl. 154—42.1)

The invention relates to a method of and means for correcting a film on which text matter has been printed in a phototypographical machine.

It is well recognized that in composing text matter in a phototypographical machine, errors may appear on the processed film which have to be corrected before a printing plate can be produced therefrom. The problem of film correction is one of primary concern, so much so, that consideration has to be given to providing an apparatus for readily correcting film containing errors. It is only when a suitable apparatus or means for correcting filmed composition is available that a phototypographical machine, which itself is operable, can be thought of as being commercially feasible.

In the past, one method of correcting phototype film was to remove an incorrect line of text matter while leaving the film in one piece and then replacing the incorrect line with a piece of film having the correct text thereon. This method included the handling of an individual piece of correct film which had to be placed in the cut-out section of the main film from which an incorrect portion had been removed, and the correct line secured therein by means such as transparent tape. This work is tedious and painstaking, involving as it does, the handling of pieces of film which might be quite small. Consider, for example, the excision from a film strip of a portion representing one twelve pica line of six point text matter. In this instance, the film strip containing the correct line of text would be approximately two inches long by one eighth of an inch wide.

It is an object of this invention to provide a film correction method and apparatus which eliminates the necessity of handling small pieces of film on which the corrected copy is photographed.

In carrying out the invention, there is provided a film which comprises lines of correct text matter, each of which is to serve as a correction for a corresponding incorrect line of text on an original film. The original film and the correction film are placed on reels, adjacent one another, on a table which permits the films and reels to be transported in a direction parallel to the axes of the reels. The lines of correct text which make up the correction film appear in the same sequence as the incorrect lines of the original film appear when the latter is unwound from its reel and carried across the table to a take-up reel. In making a correction, the original film is advanced over the table until an incorrect line is uncovered at which time the film is fixedly located by a pair of pins engaging perforations at both ends of the incorrect line. After the film is clamped in this position the correction film is advanced until the correct line corresponding to the incorrect line can be located by a second pair of pins engaging perforations at both ends of the correct line and this film is also clamped in position. With the two films clamped as described, the incorrect line is severed from its film leaving the original film in two sections. The head of the original film (that portion on the take-up reel) is transferred to a welding station wherein it abuts the leading edge of the correction film and is butt welded thereto. After transfer to a cutting station the welded-together original and correction films are severed at the foot of the correct line to separate the correct replacement line from the correction film. After the correct line has been welded to the head of the original film to form a corrected film and severed from the correction film, the next step is to butt weld the foot of the correct line to the still to be corrected original film. When this is accomplished the original film is advanced onto the take-up reel until the next line to be corrected is located as above described. This line will correspond with the now first line of the correction film and the foregoing process can be repeated.

Features and advantages of this invention will be gained from the foregoing and the description which follows.

References will be made to Figures 1 through 10 conjointly and where the description is particularly illustrated in one of figures, reference to the specific figure will be made.

The film, which is produced in a phototypographical machine such as the type disclosed in co-pending application Serial Number 419,012 filed March 26, 1954 and assigned to the assignee of the present invention, and which comprises lines of text matter some of which will contain errors of sundry kinds, is designated 20. After processing, this original film is wound on reel 21 and drawn over the mechanism tables 22 and 23 to a take-up reel 24. Immediately adjacent reel 21 is a storage reel 25 on which is disposed a correction film 26 which comprises various lines of text, correctly composed and corresponding to incorrectly composed lines on the original film. The lines of text on film 26 follow one another in the same order that incorrect lines on the original film appear as it is advanced from reel 21 to take-up reel 24. In addition, the lines of text on film 26 are immediately adjacent one another even though the corresponding incorrect lines on film 20 are spaced apart with correct lines therebetween. Specifically, the lines of text are spaced apart normal interline space distances. Furthermore, if two successive lines on film 26 are of different point size, their spacing on film 26 will be equal to one half the sum of normal interline spacing for one point size and normal interline spacing for the other point size. In this manner, as a replacement line is severed from film 26, the blank space above the next succeeding replacement line will be only that which will correctly locate the line as it is spliced to film 20. If the interline space is not as noted, additional cutting operations will be included in the method to be described. Disposed at both ends of a line of text on both films 20 and 26 are perforations 27 which bear a fixed relation to the text matter of the associated lines. These perforations are for the purpose of locating the films in the mechanism so that when the incorrect line is removed from film 20 and replaced by a correct line of text from film 26, the change will be accomplished without affecting the interline spacing of the corrected film.

Above table 22 in position to firmly hold the film 20 as it is unwound from reel 21 is film clamp 30. The clamp comprises a rigidly backed transparent pad 31 pinned for pivotal movement to forked arm 32. The pad 31 is transparent as is the forward edge of table 22 in order that film 20 may be readily scanned to discover the incorrect lines as the film is advanced across the tables. To the end that the text matter may easily be viewed, there is provided a source of light 28 beneath the table positioned to direct the light therefrom upwardly through the transparent portions of the mechanism and the film. The arm 32 is keyed to rocker shaft 33 which is journaled in film guides 34 and 35. One end of shaft 33 extends through guide 34, and is keyed to handle 36. Depending from handle 36 is member 37 which extends between rigidly fastened roller 40 and displaceable roller 41, the latter of which is pulled toward roller 40 by spring 42. The arrangement is such that when handle 36 is actuated to rock shaft 33, arm 32 is pivoted to cause pad 31 to firmly grasp film 20. Pivoting of the handle depresses member 37 such that roller 41 is displaced and spring 42 tensioned. The spring force causes the rollers to tightly grasp member 37 and hold it in depressed position, thus resulting in the film remaining clamped even though the operator lets go of the handle. To release the film, the handle is manually restored to normal position, thus rocking shaft 33 and removing the pressure from pad 31. A similar mechanism 43 is provided for clamping film 26 to table 22 as it is unwound from reel 25 (see Figs. 2 and 7).

Figure 7:
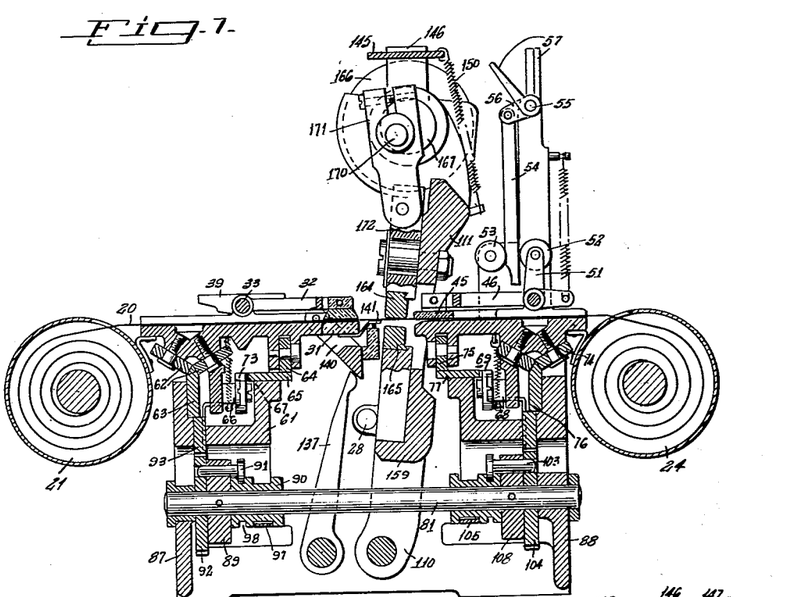
Figure 7 is a sectional view taken along line 7—7 of Figure 1.

Rearwardly of clamp 30 and disposed to grasp the corrected film which is to enter take up reel 24 is another clamp 44 (see Fig. 7). This clamp is quite similar to the previously described one in that pad 45 is pivotally pinned to forked arm 46 which in turn is pinned to rocker shaft 47. The shaft is journaled in film guides 50 and is provided with an arm 51 having a roller 52 on the end thereof spaced from a fixedly mounted roller 53. Positioned between the rollers is member 54 which is connected to handle shaft 55 through the intermediary of link 56. The shaft is rocked by forward and rearward movement of V-handle 57. As the handle is rocked rearwardly (clockwise in Figure 7) link 56 is pivoted clockwise to raise member 54, and thereby permit tension spring 60 to rock shaft 47 and cause pad 45 to clamp film 20 to table 23. Contrariwise, forward movement of the handle depresses member 54 to separate the rollers 52 and 53 and unclamp the film. In the latter instance arm 51 is pivoted backwards to rock shaft 47 and tension spring 60. The clamp will consequently be in either of two positions depending on the position of handle 57.

Figure 3:
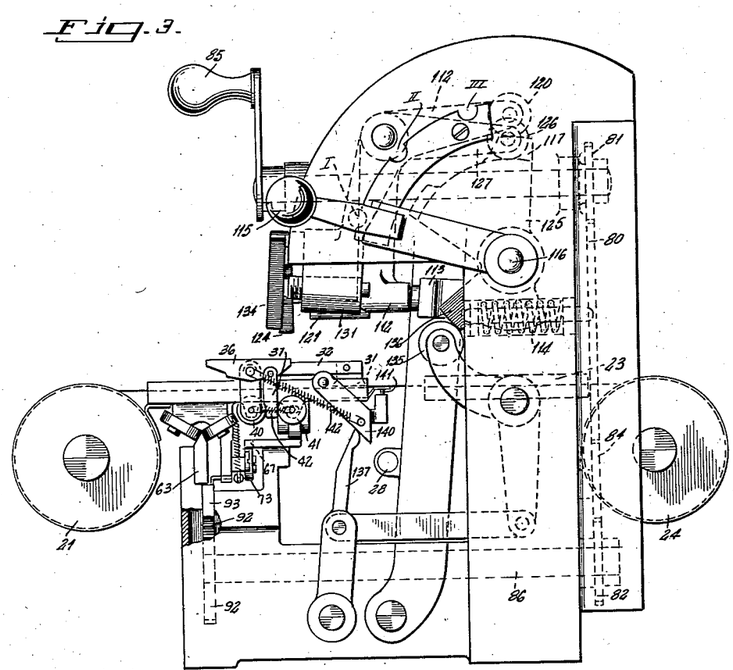
Figure 3 is a side elevation of the mechanism of Figure 1.

Table 22 is disposed on the mechanism base 61 for longitudinal movement thereon (see Figs. 3 and 7). The forward edge of the table is provided with two pairs of rollers 62, the rollers in each pair being arranged that their bearing surfaces form an acute angle to ride on the beveled edges of guide rail 63. A pair of vertically arranged wheels 64 ride on bearing plate 65 and support the rear edge of table 22. Table 22 is also provided with a pawl 66, Fig. 1, which is arranged to engage detents 67 on base 61 and which comprises a lever 70 pivotally supported on table projection 71 and urged upwardly toward base 61 by spring 72. A roller 73 on the extremity of the lever engages the appropriate detents as the table is transported along the frame and thereby fixes the location of the table in one of the three positions it may occupy during a film correction operation. Table 23 is similarly provided with rollers 74 and 75 whereby the table may be moved along guide rail 76 and bearing plate 77. Table 23 is also provided with a pawl 68 for engaging detents 69 on the base 61 but, as will hereafter be apparent, this table is only transported between two operating positions and consequently there will only be two detents 69 provided in the rear portion of bearing plate 77.

Figure 1:
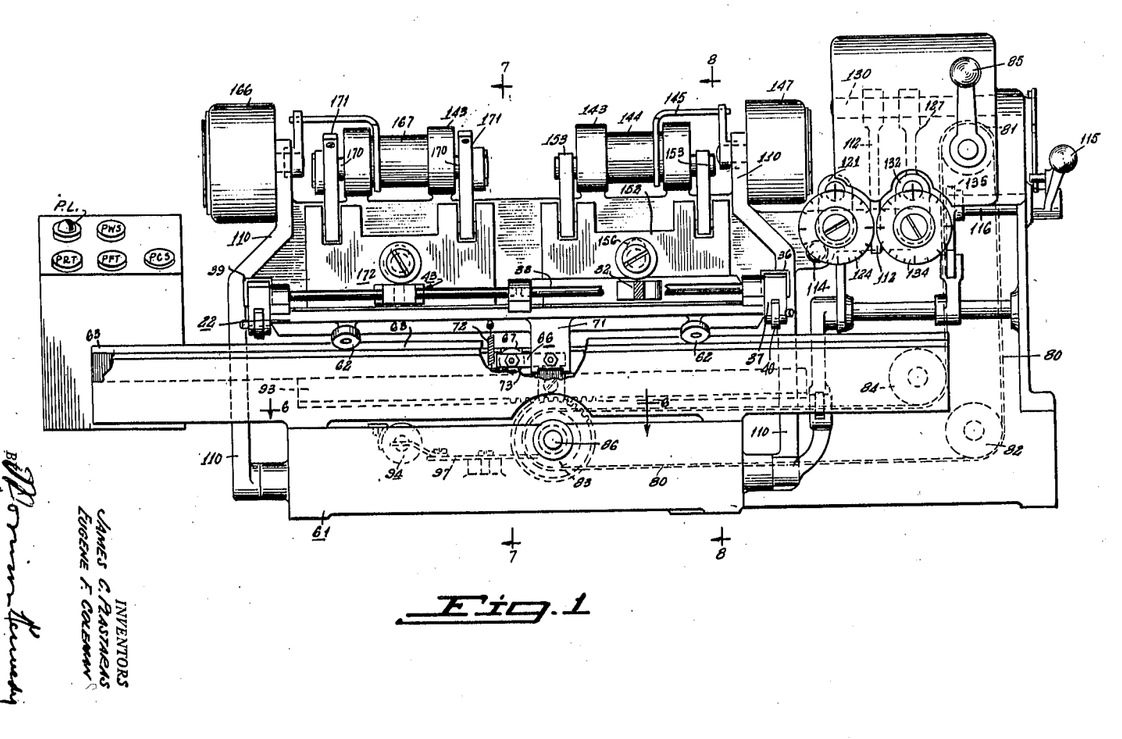
Figure 1 is a view in front elevation showing the film corrector mechanism.
Figure 2:
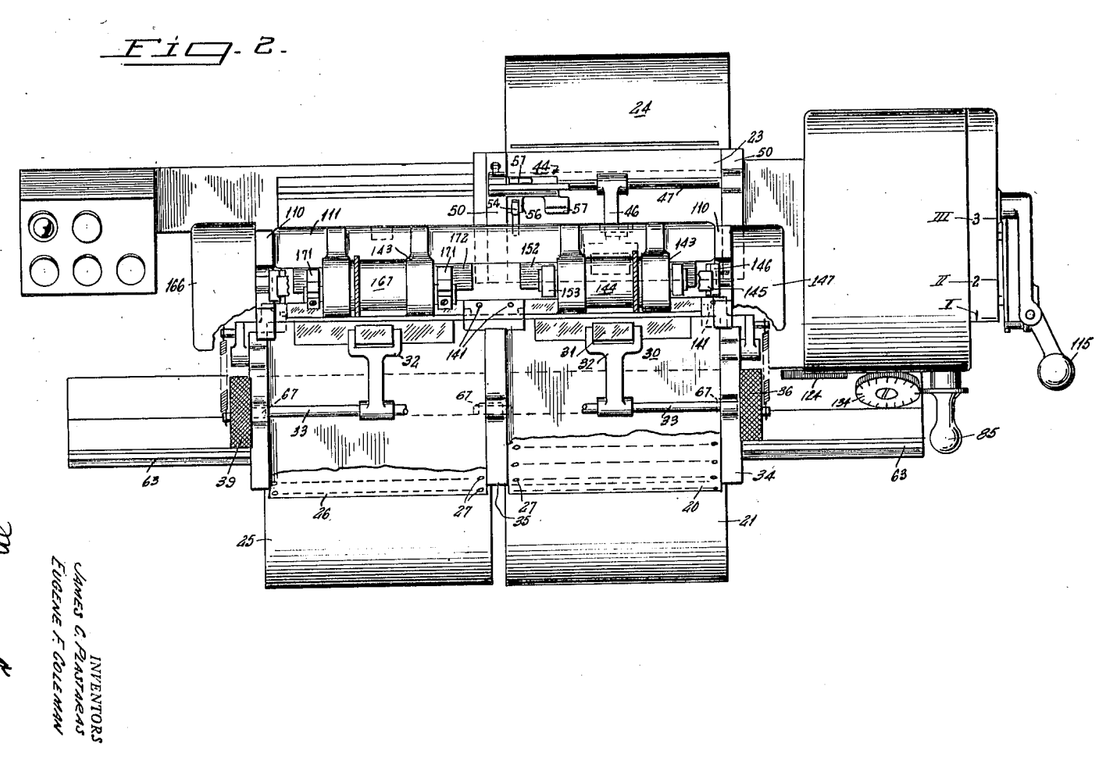
Figure 2 is a top plan view of the same mechanism.
Figure 6:
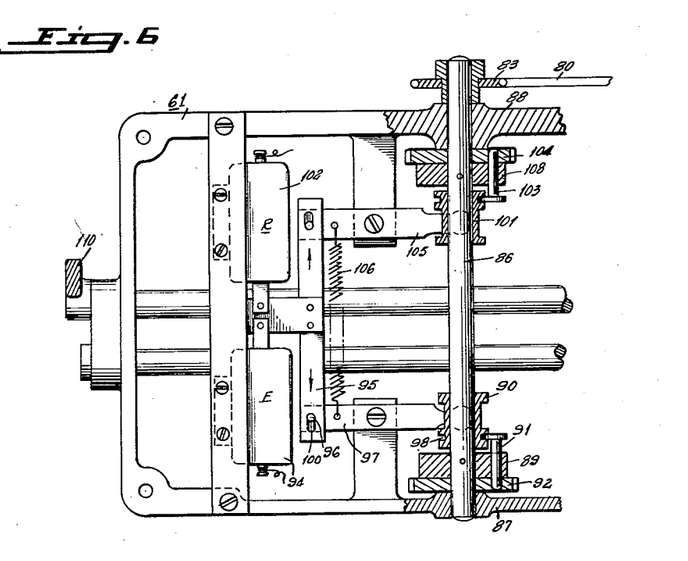
Figure 6 is a view, partly in section, taken along line 6—6 of Figure 1.

The mechanism by which the tables 22 and 23 are moved between their operating positions comprises an endless chain 80 passing around sprocket 81, idler sprocket 82, drive shaft sprocket 83, and idler sprocket 84, and driven when sprocket 81 is rotated by crank 85 (see Fig. 1). Referring now to Fig. 6, the drive shaft 86 to which sprocket 83 is pinned is journaled in the apparatus base at 87 and 88. Slideably positioned on shaft 86, is spool shaped engaging member 90. Also keyed to shaft 86 is pin carrying member 89. A pin 91 is slideably positioned in member 89 and its head rides in the peripheral groove 98 in the end rim of member 90. Thus, depending on the position of member 90 on shaft 86, pin 91 will either couple or not couple member 89 and pinion 92, the latter of which can freely turn on shaft 86. When the pin engages pinion 92, rotation of the shaft 86 will cause it to rotate and thereby drive table 22 through rack 93. On the other hand, when member 90 is positioned so that pin 91 does not engage pinion 92, rotation of shaft 86 is not transmitted to rack 93 and table 22 is not translated. Movement of member 90 along shaft 86 to engage or disengage pin 91 and pinion 92 is shown effected by a solenoid 94 which acts through T-bar 95, pin 96 and lever 97, to slide member 90. It will be noted that pin 96 extends through an elongated slot 100 in T-bar 95. A similar engaging member 101 is provided to effect the movement of table 23. A second solenoid 102 is provided, however, to disengage pin 103 carried by member 108 from pinion 104. Under normal circumstances, both pin engaging members are positioned so that both pinions are connected to drive shaft 86 and rotated when the shaft is rotated. If it is desired to transport table 22 only, solenoid 102 is energized to move T-bar 95 upwardly and pivot lever 105 clockwise thereby disengaging pin 103 from pinion 104. Consequently if shaft 86 is now rotated, such movement will not be transferred to pinion 104 and table 23 will remain in its former position. Movement of T-bar 95 upwardly will not affect lever 97 inasmuch as elongated slot 100 will prevent the exertion of any forces on pin 96. Spring 106 is connected to levers 97 and 105 to hold members 90 and 93 in clutch engaging positions except when disengaged by the operation of either of solenoids 94 or 102. It is believed to be obvious that if it is desired to translate table 23 rather than table 22, solenoid 94 will be energized to effect that result. If both tables are to be translated together, neither solenoid will be energized.

It has been pointed out above that the present mechanism effects the severing or cutting of the film and also the welding or splicing thereof. The severing apparatus and the welding apparatus now to be described are supported above the tables by a swingable frame 107, comprising stanchions 110 and cross connecting web 111. The swingable frame 107 and the apparatus carried thereby are adapted to be in either of three positions. In the first instance (see Fig. 3) this apparatus will be in a normal or non-operating position determined by normal stop lever 112 which abuts the forward side of the web projection 113 of frame 107. Frame 107 is urged forwardly by compression spring 114 against lever 112. Movement of positioning handle 115 from its normal position designated I to an operating position designated II rotates cam shaft 116 clockwise (see Figures 4 and 5). The consequent rotation of the cam 117 permits normal stop lever roller 120 to ride off the high portion of the cam and thereby permit the frame 107 to move forward under the urgings of spring 114. The frame and the apparatus therefore move forward until such motion is arrested by fixedly mounted stop 121. The stop comprises a threaded bushing 122 through which an adjustment screw 123 passes. The position of screw in the bushing is controlled by knurled dial 124 which is adjusted in accordance with the point size line to be corrected. The cut which is effected with handle 115 in operating position II will be termed the foot cut i. e., the cut below the base of the incorrect line and above the next following correct line. This cut is made a distance below the incorrect line which is equal to one half the normal interline spacing for the point size of the incorrect line being removed. Further rotation of cam shaft 116 in a clockwise direction as by handle 115 being moved to operating position III, rotates cam 125 until roller 126 rides up the rise of the cam and pivots bell crank 127 about stub shaft 130. This pivotal movement of crank 127 brings adjustable stop 131 into abutting relationship with the web projection 113. The second operating, or third position, of frame 107 is thus determined, it being between the first operating position and the normal position. The adjustable stop 131, like the fixed stop 121, comprises a threaded bushing 132 fixed at the end of crank 127. An adjustment screw 133 is threaded therein to control the exact operating position of the frame in accordance with the point size of the line being corrected. As before, a calibrated knurled dial 134 is provided to facilitate correct setting of the screw 133. This latter position of the frame locates the cutting and splicing apparatus for the head cut and splicing of the corrected line to that portion of film 20 which is being wound on take up reel 24.

Figure 4:
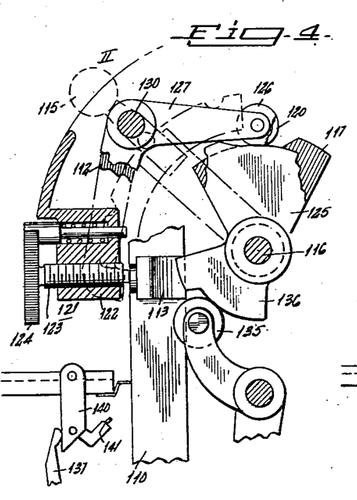
Figure 4 is a fragmentary view of the cam structure of Figure 3 and showing the parts set in one film severing and film splicing position.
Figure 5:
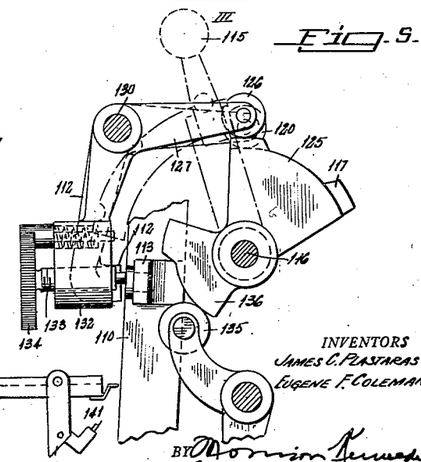
Figure 5 is a view similar to Figure 4, but showing the parts set in a different film severing and film splicing position.

Perusal of Figures 3, 4 and 5 will show that when frame 107 is in its normal position (handle 115 in position I) bell crank roller 135 is on the high portion of cam 136 thereby pivoting abutment 137 to engage lever 140 and move film locating pins 141 into a projecting or operative position. Movement of handle 115 towards positions II and III rotates cam 136 so that the roller 135 enters the dwell thereof to permit spring 142 to act on lever 140 and thereby retract pins 141.

Figure 8:
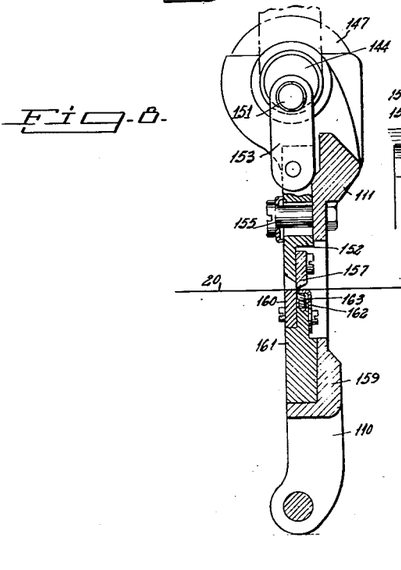
Figure 8 is a segmental sectional view taken through the line severing device along line 8—8 of Figure 1.
Figure 9:
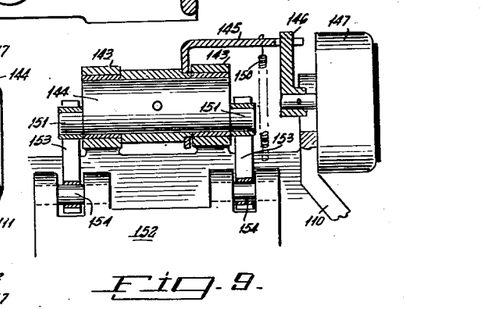
Figure 9 is a vertical sectional view taken through the axis of the power drive for the film severing device shown in Figure 8.

Figures 8 and 9 show in section the cutting apparatus for severing the film. The web 111 has fashioned thereon near the top, a pair of spaced apart bushings 143 in which turn a shaft 144 is arranged. This shaft is provided with a sleeve and projection 145 pinned thereto and adapted to be engaged by solenoid arm 146 which in turn is secured to the shaft of the rotary solenoid 147. Energization of the solenoid causes member 144 to be rocked in bushings 143. At the ends of shaft 144 are eccentrics 151 which are connected to the knifeholder 152 by means of links 153. The links are pivotal on both the eccentrics and the pins 154 of the knifeholder. The knifeholder 152 is held flush against web 111 by a bolt 155 passing through an elongated slot 156 in the holder which thus permits the knifeholder to be moved vertically with respect to the web. A knife 157 is provided at the lower extremity of holder. Below the knife is the cutting face 160 carried by support 161 which in turn is secured to the lower portion 159 of the web 111. A stripping member 162 is provided directly under the knife edge to form a resilient cutting surface. Compression spring 163 aids in restoring the stripping member 162 to normal position after a cut has been made. A spring 150 is provided to maintain the knife 157 in normal position and to restore it to this position after a severing operation has been effected and solenoid 147 deenergized. It is clear from Figure 4 that as the frame 107 is pivoted in response to the actuation of handle 115 the knife is carried to different positions above film 20 and can therefore completely remove an incorrect line from the film.

Figure 7 shows the welding or splicing apparatus carried by the frame. As is apparent, this apparatus is quite similar to the cutting apparatus except that heating elements 164 and 165 are provided in place of the knife 157 and the cutting surface 160. As in the case of the knife, heating element 164 is actuated in response to the energization of a rotary solenoid 166 which rocks member 167 and eccentrics 170. A pair of links 171 join the eccentrics to the movable heating element holder 172 which is mounted on web 111 in a manner similar to knifeholder 152.

Figure 10:
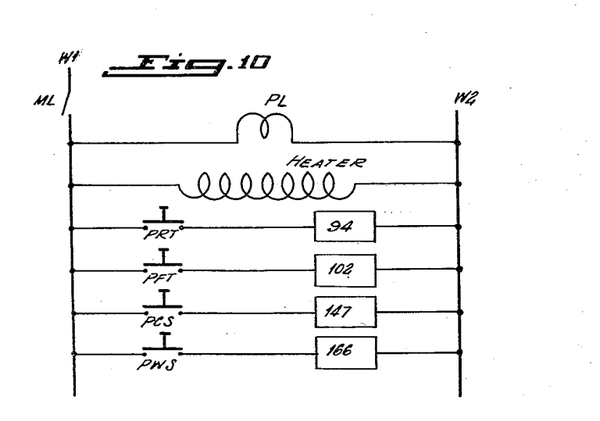
Figure 10 is a simplified wiring diagram showing the circuits for the control solenoids employed in the apparatus.

Figure 10 shows a simplified wiring diagram in which a D. C. power source (not shown) is connected to lines W1 and W2. A main line switch ML is shown for connecting the circuits to the power source. Closure of this switch immediately connects pilot light PL across lines W1—W2 thus indicating that the individual circuits may be energized. Also the heating elements, so marked, are energized to prepare the welding apparatus for operation. The push buttons are appropriately designated. Thus if the operator wishes to transport the front table, he depresses front table push button PFT. It will be recalled from the description of the transport mechanism that when the front table is to be moved, the solenoid 102 for the rear table is energized to disconnect pin 103 from rear pinion 104. Consequently front table push button PFT completes a circuit for the energization of rear table solenoid 102. Conversely, when it is desired to transport the rear table only, rear table push button PRT is depressed to complete a circuit for the energization of front table solenoid 94. If both tables are to be moved simultaneously, neither push button is depressed. When it is desired to effect a cutting operation push button PCS is depressed to energize solenoid 147 which effects a movement of knife 157 to sever the film. Likewise, when it is desired to effect a splicing operation, push button PWS is depressed to effect actuation of movable heating element 164. Release of any of the push buttons, of course, results in the restoration of any operated apparatus to normal position.

In operation, the film 20 to be corrected is placed on reel 21 and the film 26, which carries the lines of corrections, is placed on reel 25. Handle 115 is in position I so that film locating pins 141 are in projected position. Film 26 is then advanced so that the locating holes at the ends of the first line of corrections are engageable with the pins. Handle 39 is next actuated to clamp the film firmly to the table 22. The operator advances film 20 across the tables, winding it on to take up reel 24, until the incorrect line which is to be replaced by the first correct line of film 26 is located by pins 141 and locating perforations 27 at the ends of the incorrect line. Handles 36 and 57 are thereupon actuated to clamp film 20 to both tables 22 and 23, respectively.

Figure 11:
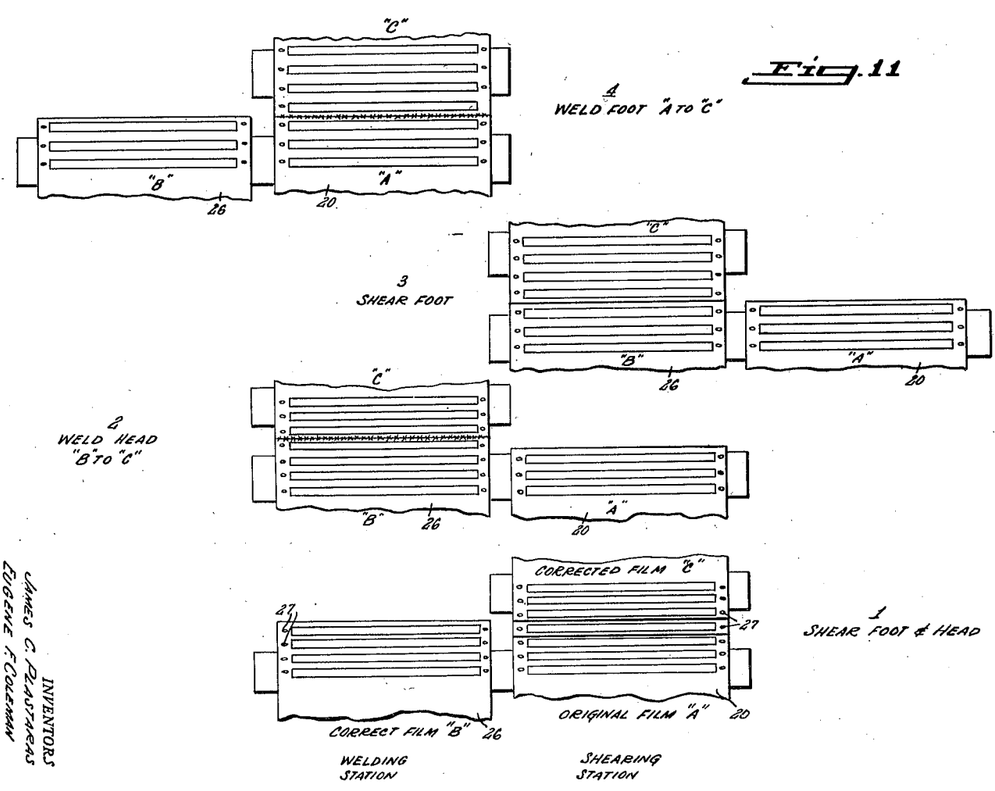
Figure 11 is a schematic diagram showing the various steps in the film correcting method.

In the next order of adjustments, dials 124 and 134 are set in accordance with the point size of the line to be replaced in film strip 20. These dials, of course, control the exact position of abutment screws 123 and 133 and thereby control the positions which the knife and welding units will take to make the foot cut and splice and the head cut and splice respectively. The cuts will be made above and below an incorrect line a distance equal to one half the normal interline spacing for text of the same point size as the incorrect line. Having thus set the mechanism, the operator is ready to begin the actual process of replacing the incorrect line in film strip 20 with the correct line from film strip 26. The steps to be now described can perhaps be followed more clearly by reference to Figure 11 which illustrates the movements and positions of the various films during the correction process.

The operator moves handle 115 to position II which action results in pins 141 being retracted from the perforations 27 and frame 107 being brought into abutting relation with stop 121. This is the position wherein the film 20 is severed below, or at the foot of, the incorrect line. Depression of push button PCS results in the energization of solenoid 147 and the consequent severing of the film. The operator thereupon moves handle 115 to position III which action swings stop 131 into position to move frame 107 against the action of spring 114 and thereby move the cutting element into position above, or at the head of, the incorrect line. Depression of push button PCS results in the complete severing of the line from the film. Film 20 is now clamped to the tables 22 and 23 in spaced apart relationship, the spacing being that of the line removed.

The operator then brings the head portion of film 20 (that portion clamped to rear table 23) into abutting relation to film 26. To do this the operator will only effect the moving of the rear table by depressing push button PRT. With the push button PRT depressed, crank 85 is actuated until pawl 68 and detent 69 provide the operator with an indication that film 20 is properly located. Insofar as the blank space above the text matter of the replacement line is equal to one half the normal interline spacing for the text point size, the head portion of film 20 will abut film 26. Push button PWS is then depressed to effect the butt splicing of the head portion of film 20 to correcting film 26. After the splicing operation has taken place, both tables are transported to bring the spliced film to the cutting station. Handle 115 is moved to position II in order to effect a severing operation at the foot of the correct line which is being inserted in film 20. Having thus moved the cutting apparatus, push button PCS is depressed to actuate the knife and thereby separate the correct line from film 26. In severing the film, the cut is made a distance below the replacement line equal to one half the normal interline space for the replacement line. In the preferred arrangement, the cut will also be one half the normal interline spacing above the next succeeding replacement line. It is clear that now the correct line has been joined to the head portion of film 20 in the same relative position as was the incorrect line which was removed in the first step of the correction process. To complete the process, the foot portion of film strip 20 has to be spliced to the foot of the inserted correct line.

The front table is next translated to restore film strip 26 to its original position in the welding station. This is effected by the actuation of push button PFT coincident with rotation of crank 85. With each of the films in its original position, as now, film strip 20 is still severed at the foot of the line being inserted, but the film is in abutting relationship. Therefore, both front and rear tables are simultaneously moved to bring film 20 into position at the welding station. The welding apparatus is in position for a foot weld insofar as handle 115 is still in position II where it was last moved. Push button PWS is thereupon depressed to effect the butt splicing of film 20. Both tables are then translated to bring film strip 20 to the cutting station and film 26 to the welding station, or in other words both films are brought to their original positions. It is clear now, that the incorrect line has been removed from film 20 and replaced by a correct line from film 26 without the handling of individual pieces of film or in fact, without the handling of the film during the severing and splicing operations. The films can now be unclamped from the tables and handle 115 returned to position I to project pins 141 in preparation for the next correcting operation which takes place in the sequence just described.

It is not intended to set forth all the variations that may be made, but it is contemplated that many of the features of the invention disclosed may be carried out in other ways and that many widely different embodiments of the invention can be made without departure from the spirit and scope of the invention. For example, spacing of the correct replacement lines of text on film 26 may differ from that disclosed. It is therefore intended that all matter contained in the above description or shown in the accompanying drawings shall be interpreted as illustrative and not in a limiting sense.

What is claimed is:

1. The method of correcting film on which text matter has been printed in a phototypographical machine and in which the text matter includes lines in which errors appear, said method comprising the steps of severing the original incorrect film to remove an incorrect portion thereof and leave the film in two sections, splicing one section of the original film to a correction film containing a correct portion to replace the incorrect portion removed from the original film, severing the thus newly formed film strip so that only the correct portion of the correction film is spliced to the aforesaid section of the original film, and thereafter splicing the other section of the original film to the correct portion to form a corrected film.

2. A phototypographical film correction method which includes the steps of removing an incorrectly composed section from an original film strip and replacing it by a corresponding correctly composed section removed from a correction film strip, characterized in that the replacement section, before it is severed from the correction strip, is spliced to one portion of the original strip after the incorrect section has been severed from said portion and then later, after being severed from the correction film strip, is spliced to the other portion of the original film strip after the incorrect section has been severed from said other portion, thereby forming a continuous corrected film strip without handling the replacement section as a separate individual piece.

3. A phototypographical film correction method according to claim 2, in which the steps are carried out in the following sequence for individual line corrections: the original film strip is first severed below and then above the incorrect section, next the lower end of the head portion of the original strip is spliced to the top of the replacement section while the latter remains a part of the correction film strip, thereafter the correction film strip is severed below the replacement section, and finally the upper end of the foot portion of the original strip is spliced to the bottom of the replacement section to form a continuous corrected film strip.

4. The method of correcting a film on which text matter has been printed in a phototypographical machine by replacing incorrect lines therein with correctly composed lines from a correction film comprising correct lines corresponding to incorrect lines of the original film, said films having locating holes which bear a predetermined relationship to each line on each film, said method comprising the steps of locating the original film to be corrected in an apparatus by means of the locating holes, similarly locating the film comprising the corrections, severing the original film above and below an incorrect line, thus leaving said film in two sections, splicing that section of the original film which was above the incorrect line to the film comprising the corrections so that the correct replacement for the incorrect line is properly located with respect to the original film section, severing the composite film strip to separate the replacement line from the corrections which follow it on the correction film, and thereafter splicing the section of the original film which was below the incorrect line to the replacement line to form a corrected film.

5. The method of correcting a film on which text matter has been printed in a phototypographical machine by replacing incorrect lines therein with correctly composed lines from a correction film comprising correct lines corresponding to incorrect lines of the original film, said films having locating holes which bear a predetermined relationship to each line on each film, said method comprising the steps of positioning the original film by means of the locating holes so that the film may be severed above and below an incorrect line which is to be replaced, severing the original film above and below the incorrect line, thus leaving said film in two sections, positioning the film made up of corrections by means of the locating holes so that the replacement line therein which corresponds to the line removed from the original film bears a predetermined relationship to the two sections of the original film, splicing that portion of the original film which was bove the incorrect line to the correction film, severing the thus formed composite film along a line below the replacement line, and thereafter splicing that portion of the original film which was below the incorrect line to the replacement line to form a corrected film.

6. A mechanism for correcting film produced in a phototypographical machine which comprises, a film cutting apparatus, a film splicing apparatus, two holders for film to be corrected, a third holder for film to be used as corrections, and means for transporting all three said film holders to the film cutting position and to the film splicing position in the desired sequence.

7. A mechanism for correcting film produced in a phototypographical machine which comprises, a film cutting apparatus, a film splicing apparatus, a first table moveable between said cutting and splicing apparatuses, a second table moveable between said cutting and splicing apparatuses, means for holding a film to be corrected on said first table, means for holding said film on said second table, means for holding a film containing corrections on said first table, and means for transporting said tables holding said films to the film cutting position and to the film splicing position in the desired sequence.

8. A mechanism for correcting film produced in a phototypographical machine which comprises, a film cutting apparatus, a film splicing apparatus, a first table, a second table, means for clamping a film to be corrected to said first table, means for clamping said film to said second table, locating means for fixing the location of said film on said tables, means for clamping a second film which contains the corrections to said first table, means for locating said second film on said first table, and means for tarnsporting said tables to the film cutting position and to the film splicing position in the desired sequence.

9. A mechanism for correcting film produced in a phototypographical machine which comprises, a first means for supporting a film to be corrected, a second means for supporting a film containing the corrections, a film cutting apparatus, a film splicing apparatus, means supporting said apparatuses in operating position with respect to both the first and second said film supporting means, means for locating said apparatuses in one cutting and splicing position relative to film carried by all of said film supporting means, and means for locating said apparatuses in a second cutting and splicing position relative to film carried by all of said film supporting means.

10. A mechanism for correcting film produced in a phototypographical machine which comprises a first table having means for clamping a to-be-corrected film thereto and means for clamping a correcting film thereto, a second table having means for clamping the to-be-corrected film thereto, means for severing a film, means for splicing a film, means for locating said films preparatory to a severing and splicing operations, means for transporting said tables to the film severing position and to the film splicing position in the desired sequence, means for positioning said severing and said splicing means to sever and splice a film at the head of the incorrect portion of the film, and means for positioning said severing and said splicing means to sever and splice a film at the foot of the incorrect portion of the film.

11. A mechanism for replacing an incorrect portion of an original film of text matter printed in a phototypographical machine with a correct portion from a correction film wherein the correct portion is joined to a section of the original film before being separated from the correction film, said mechanism comprising, a film cutting apparatus, a film splicing apparatus, two holders for film to be corrected, a third holder for film to be used as corrections, and means for transporting all three said film holders to the film cutting position and to the film splicing position in the desired sequence.

12. An apparatus for removing an incorrectly composed section from an original film strip and replacing it by a corresponding correctly composed section removed from a correction film strip, said apparatus comprising, in combination, a film cutting device and a film splicing device arranged side by side, a front table which supports the original film strip and the correction film strip in side by side relation and having means for clamping said strips in place thereon, a rear table which supports the corrected film strip and having means for clamping said strip thereon, and means for shifting said tables laterally with reference to the film cutting device and the film splicing device as well as laterally with reference to each other in performing the desired cutting and splicing operations.

13. An apparatus according to claim 12, including means for registering the correctly composed sections of the correction film strip in transverse alignment with the incorrectly composed sections of the original film strip before the cutting and splicing operations are performed.

14. An apparatus according to claim 13, wherein the registering means are in the form of retractible pins which engage in perforations along the edges of the film strips.

15. An apparatus according to claim 12, wherein the film cutting device is adjustable to two different cutting positions and wherein the film splicing device is likewise adjustable to two different splicing positions.

16. An apparatus according to claim 15, wherein the film cutting device and the film splicing device are mounted on a common supporting frame which is adjustable to two different positions.

17. An apparatus according to claim 16, including means for controlling the adjustment of the supporting frame in accordance with the cutting and splicing operations to be performed.

18. An apparatus according to claim 12, wherein the table shifting means are common to the two tables, and including a device for connecting said shifting means to either table for independent movement or to both tables for conjoint movement.

19. An apparatus according to claim 12, including a power unit for operating the film cutting device, and a separate power unit for operating the film splicing device.

20. An apparatus according to claim 19, including means for controlling the operation of the two power units selectively in accordance with the cutting and splicing operations to be performed.

References Cited in the file of this patent
UNITED STATES PATENTS

| Number | Name | Date |
| --- | --- | --- |
| 1,124,531 | Saltzman | Jan. 12, 1915 |
| 1,207,506 | Cornwall | Dec. 5, 1916 |
| 1,803,411 | Stechbart | May 5, 1931 |
| 1,804,730 | Wittel | May 12, 1931 |
| 2,200,203 | Heintz | May 7, 1940 |
| 2,377,292 | Donaldson | May 29, 1945 |
| 2,468,629 | Herzig et al. | Apr. 26, 1949 |
| 2,503,126 | Muldrow et al. | Apr. 4, 1950 |